United States Patent
Lablanc et al.

(10) Patent No.: US 10,287,488 B2
(45) Date of Patent: May 14, 2019

(54) METHODS AND SYSTEMS FOR FORMING A FRACTURING FLUID FROM A SOURCE OF METAL-LADEN WATER

(71) Applicant: Halliburton Energy Services, Inc., Houston, TX (US)

(72) Inventors: Benjamin Edward Lablanc, Humble, TX (US); Enrique Antonio Reyes, Tomball, TX (US); Alyssa Lynn Lablanc, Humble, TX (US); Aaron Michael Beuterbaugh, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/542,070

(22) PCT Filed: Feb. 13, 2015

(86) PCT No.: PCT/US2015/015754
§ 371 (c)(1),
(2) Date: Jul. 6, 2017

(87) PCT Pub. No.: WO2016/130137
PCT Pub. Date: Aug. 18, 2016

(65) Prior Publication Data
US 2018/0273832 A1 Sep. 27, 2018

(51) Int. Cl.
*C09K 8/88* (2006.01)
*C09K 8/68* (2006.01)
(Continued)

(52) U.S. Cl.
CPC .............. *C09K 8/68* (2013.01); *C09K 8/685* (2013.01); *C09K 8/725* (2013.01); *C09K 8/88* (2013.01);
(Continued)

(58) Field of Classification Search
None
See application file for complete search history.

(56) References Cited

U.S. PATENT DOCUMENTS 4,596,765 A * 6/1986 Kurematsu ............ G03C 7/413
430/467
5,019,343 A 5/1991 Hwa et al.
(Continued)

FOREIGN PATENT DOCUMENTS

WO WO-2012/080463 A1 6/2012
WO WO-2012127183 A1 9/2012
(Continued)

OTHER PUBLICATIONS

Barakat, "New trends in removing heavy metals from industrial wastewater," Arabian Journal of Chemistry, 2011, vol. 4, Iss 4, pp. 361-377.
(Continued)

*Primary Examiner* — Andrew Sue-Ako
(74) *Attorney, Agent, or Firm* — McGuireWoods LLP

(57) ABSTRACT

Extraneous metal ions in a source of water can often make the water unsuitable for use as the continuous phase of an aqueous fracturing fluid. Extraneous metal ions can be a particular issue for produced water and other process water sources. Methods for treating water and forming a fracturing fluid therefrom can comprise: providing a metal-laden water comprising a quantity of one or more metal ions; combining an N-(phosphonoalkyl)iminodiacetic acid or a salt thereof with the metal-laden water to form a remediated water, the remediated water comprising the N-(phosphonoalkyl)iminodiacetic acid, the salt thereof, a metal complex thereof or a combination thereof; and formulating the remediated water into a fracturing fluid comprising a gelled polymer.

18 Claims, 2 Drawing Sheets

(51) Int. Cl.
*C09K 8/72* (2006.01)
*E21B 43/26* (2006.01)
*E21B 37/06* (2006.01)
*E21B 41/02* (2006.01)
*E21B 43/267* (2006.01)

(52) U.S. Cl.
CPC .............. *C09K 8/887* (2013.01); *E21B 43/26* (2013.01); *E21B 37/06* (2013.01); *E21B 41/02* (2013.01); *E21B 43/267* (2013.01)

(56) References Cited

U.S. PATENT DOCUMENTS

| | | | | |
|---|---|---|---|---|
| 5,059,573 | A | * | 10/1991 | Sasaki ...................... B01J 23/31 502/205 |
| 6,303,039 | B1 | | 10/2001 | Back et al. |
| 8,584,757 | B2 | | 11/2013 | Reyes |
| 2008/0287323 | A1 | * | 11/2008 | Li ............................. C12N 9/99 507/211 |
| 2013/0000902 | A1 | | 1/2013 | Welton et al. |
| 2013/0000910 | A1 | | 1/2013 | Welton |
| 2013/0031970 | A1 | * | 2/2013 | Freese ...................... C09K 8/62 73/152.18 |
| 2013/0157905 | A1 | * | 6/2013 | Saini ........................ C09K 8/685 507/212 |
| 2013/0224308 | A1 | | 8/2013 | De Windt et al. |
| 2017/0275527 | A1 | * | 9/2017 | LaBlanc ................. C09K 8/512 |

FOREIGN PATENT DOCUMENTS

WO  WO-2012/171858 A1  12/2012
WO  WO-2014164835 A1  10/2014

OTHER PUBLICATIONS

Ely et al., "Game Changing Technology for Treating and Recycling Frac Water," SPE Annual Technical Conference and Exhibition held in Denver, CO, Oct. 30-Nov. 2, 2011, SPE 145454.

Haghshenas et al., "Effect of Dissolved Solids on Reuse of Produced Water in Hydraulic Fracturing Jobs," SPE Latin American and Caribbean Petroleum Engineering Conference held in Maracaibo, VE, May 21-23, 2014, SPE-169408-MS.

Seth et al., "Maximizing Flowback Reuse and Reducing Freshwater Demand: Case Studies from the Challenging Marcellus Shale," SPE Eastern Regional Meeting held in Pittsburgh, PA, Aug. 20-22, 2013, SPE 165693.

International Search Report and Written Opinion from PCT/US2015/015754, dated Sep. 22, 2015.

* cited by examiner

METHODS AND SYSTEMS FOR FORMING A FRACTURING FLUID FROM A SOURCE OF METAL-LADEN WATER

BACKGROUND

The present disclosure generally relates to water remediation and management, and, more specifically, to methods in which the presence of various metal ions in a metal-laden water is mitigated.

Treatment fluids can be used in a variety of subterranean treatment operations. Such treatment operations can include, without limitation, drilling operations, stimulation operations, production operations, remediation operations, sand control treatments, and the like. As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid or a component thereof, unless otherwise specified herein. More specific examples of illustrative treatment operations can include, for example, drilling operations, fracturing operations, gravel packing operations, acidizing operations, scale dissolution and removal operations, sand control operations, consolidation operations, and the like.

Many types of subterranean treatment operations use treatment fluids containing a continuous phase that is "viscosified" or "gelled." These terms will be used synonymously herein. In illustrative examples, gelled fluids may be used in fracturing operations, gravel packing operations, fluid diversion and fluid loss control operations, well kills, and the like. Common gelling agents can include viscoelastic surfactants and viscosifying polymers, including polymers that are crosslinked with a crosslinking agent. Polymeric gelling agents can include biopolymers or synthetic polymers. Gellable synthetic polymers can include acrylamide polymers, copolymers and their derivatives, for example. A multitude of gellable biopolymers and biopolymer derivatives are known in the art. Biopolymers and their derivatives may be particularly desirable in subterranean treatment operations due to their degradation into environmentally benign byproducts over time. Gelled fluids may be further classified as described below in reference to fracturing fluids.

Although non-crosslinked polymers may increase the viscosity of a fluid, a more pronounced viscosity increase may be obtained upon crosslinking adjacent polymer chains. A variety of crosslinking agents are available for forming a crosslinked polymer. Depending upon a number of factors such as, for example, the chemical and physical conditions to which a fluid subject to gelation is to be exposed, the desired time to gelation, the desired gel strength and gel stability, and the like, a particular class of crosslinking agent may be chosen for use in conjunction with a given gellable polymer to best accomplish the gel's intended purpose. Polyalkyleneimines and polyalkylenepolyamines are organic crosslinking agents that may be used to form a gelled polymer, particularly with acrylamide polymers and their derivatives. Transition metal ions (e.g., chromium, vanadium, titanium, zirconium, and the like) and main group metal ions (e.g., aluminum, antimony, tin, and the like) may also be used to affect crosslinking in the course of forming a gelled fluid. Metal ion crosslinking agents often function most effectively in a circumneutral to modestly acidic pH range, such as a pH of about 4.5 to about 8. At modestly basic pH values, such as pH values above about 8.5, boric acid, boronic acid and borate crosslinking agents may also be used to affect crosslinking.

Fracturing fluids and gravel packing fluids are often viscosified in order to provide the fluid with sufficient capability to convey particulate matter (e.g., proppant particulates or gravel particulates) into a wellbore. Water frac or "slickwater" fracturing operations are run at high pump rates using a fluid phase containing a relatively low concentration of a non-crosslinked acrylamide polymer or copolymer. Linear gels with higher viscosities may be formed at increased polymer concentrations, particularly when using a non-crosslinked biopolymer or an incompletely crosslinked biopolymer. Linear gels remain flowable and are frequently used in fracturing operations and gravel packing operations. Even higher fluid viscosities may be obtained by extensively crosslinking the biopolymers of linear gels with metal ions, thereby forming a crosslinked gel. Crosslinked gels are much more difficult to flow due to their higher viscosity values. Although crosslinked gels may be used in fracturing operations, they have a higher propensity to promote subterranean formation damage than do linear gels and they require even higher pump rates.

In some cases, it can be desirable to form a crosslinked gel within a subterranean formation. For example, it may sometimes be desirable to form a temporary or permanent fluid seal within a wellbore using a crosslinked gel. However, if the formation of a crosslinked gel occurs unexpectedly or in an improper location within a wellbore, for example, the situation can be very difficult to address and may necessitate a remediation operation. In illustrative examples, unwanted gelation may occur upon the gelling agent encountering higher than expected temperature conditions or inadvertently contacting extraneous crosslinking metal ions. Unwanted contact of a gelling agent with crosslinking metal ions can preclude the use of some types of water for forming a viscosified fluid, as discussed hereinafter.

Water conservation and management are becoming increasingly important concerns for the oilfield industry. On the treatment side of subterranean operations, immense volumes of water (millions of gallons per well) are used in the course of drilling, treating and producing a wellbore. Sourcing and transportation requirements for the water can represent a significant cost liability. On the production side, at least a portion of the introduced water may be subsequently produced from the wellbore in the course of producing a desired hydrocarbon resource, such as oil. Groundwater may also be produced from a wellbore in conjunction with a hydrocarbon resource. Increasingly strict environmental regulations have made disposal of produced treatment fluids, produced groundwater and other process water sources a significant issue. The complex chemical nature of produced water and other process water sources often necessitates long-term storage of the water while awaiting chemical analyses, and oftentimes remediation to make the produced water suitable for disposal. These factors can significantly expand the required infrastructure at a job site and increase the time and expense needed for producing a hydrocarbon resource from a subterranean formation. Of particular note, a multitude of metal ions of varying types may be present in produced water and other process water sources, which may be difficult to remediate effectively due to the chemical complexity of potentially interfering metal ions. Organic constituents may also be present in the produced water, alone or in combination with metal ions.

BRIEF DESCRIPTION OF THE DRAWINGS

The following figures are included to illustrate certain aspects of the present disclosure and should not be viewed as exclusive embodiments. The subject matter disclosed is capable of considerable modifications, alterations, combinations, and equivalents in form and function, as will occur to one having ordinary skill in the art and the benefit of this disclosure.

DETAILED DESCRIPTION

Figure 1:
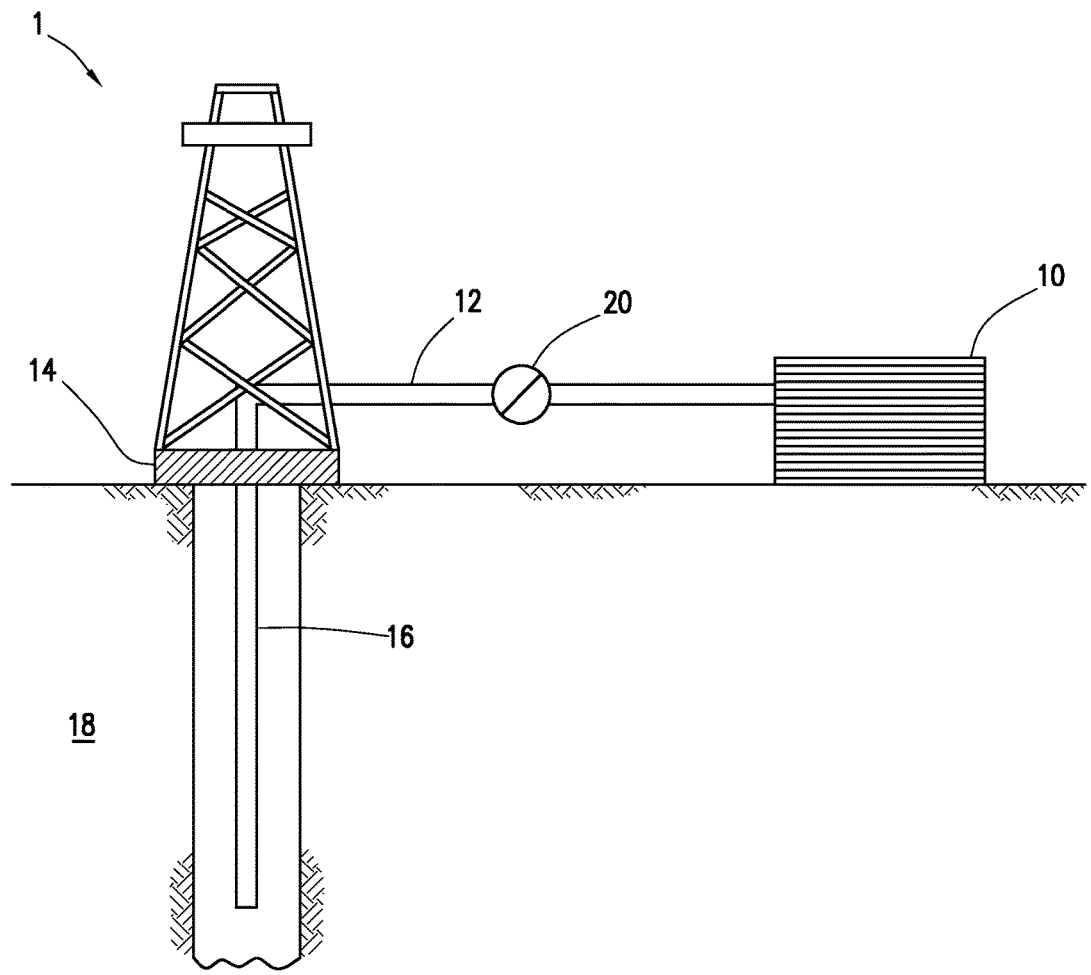
FIG. 1 shows an illustrative schematic of a system that can deliver fracturing fluids of the present disclosure to a downhole location, according to one or more embodiments.

The present disclosure generally relates to water remediation and management, and, more specifically, to methods in which the presence of various metal ions in a metal-laden water is mitigated.

One or more illustrative embodiments incorporating the features of the present disclosure are presented herein. Not all features of a physical implementation are necessarily described or shown in this application for the sake of clarity. It is to be understood that in the development of a physical implementation incorporating the embodiments of the present disclosure, numerous implementation-specific decisions may be made to achieve the developer's goals, such as compliance with system-related, business-related, government-related and other constraints, which may vary by implementation and from time to time. While a developer's efforts might be time-consuming, such efforts would be, nevertheless, a routine undertaking for one having ordinary skill in the art and the benefit of this disclosure.

As discussed above, there are often tremendous amounts of water present at a job site and in need of management in some manner. Such water may include both produced water and water destined for being introduced downhole in the course of drilling, treating and producing the wellbore. At a minimum, management of the water at a job site can include ensuring sufficient supply and/or storage capacity for multiple types of water in order to support an ongoing job without interruption. Although there may be a ready supply of produced water at job site, it is frequently not suitable for direct reintroduction into a wellbore in the form of a treatment fluid due to its often complex chemical nature and common incompatibilities with one or more constituents of a particular treatment fluid.

Significant cost and logistical issues during subterranean treatment operations could be averted if produced water could be effectively used in formulating aqueous treatment fluids. To accomplish this goal, produced water must be able to undergo rapid remediation at a job site in order to support its reuse as a newly formulated treatment fluid. Specifically, by rapidly addressing the presence of problematic metal ions in a water source, decreased logistical and cost issues during subterranean treatment operations can be realized.

More particularly, the gelled treatment fluids may be formulated using a source of water containing one or more metal ions that would otherwise produce detrimental effects. Detrimental effects of extraneous metal ions that may be averted through practicing the methods of the present disclosure include, for example, unwanted crosslinking of a linear gel into a crosslinked gel and competition of the metal ions with another crosslinking agent having different properties. Either of these factors may presently preclude formulation of treatment fluids from produced water or other process water sources containing metal ions.

In order to realize the foregoing, a particular class of chelating agents may rapidly complex metal ions in a metal-laden water source, and the ensuing metal complexes may remain in a formulated treatment fluid without substantially impacting its viscosification. Other advantages may also be conveyed by these chelating agents, as discussed below. As used herein, the terms "complex," "complexing," "complexation" and other grammatical variants thereof will refer to the formation of a metal-ligand bond, such as through formation of a chelate or other metal-ligand entity. The metal complexes may be simply formed by mixing the chelating agent with the metal-laden water, either in a static or dynamic mixing configuration, without special preparation or equipment, and the remediated water, containing a metal complex of the chelating agent, may then be formulated into a treatment fluid. Without being bound by theory or mechanism, complexation of the metal ions in the metal-laden water source may convert the metal ions into a form that is unreactive for promoting crosslinking, thereby allowing a desired and intentionally added crosslinking agent to react in its planned manner. Moreover, the metal complexes of the chelating agent remain stable and do not markedly affect the properties of the treatment fluid once formed.

With regard to water sourcing and management, the foregoing techniques are highly advantageous in that they may allow water sources that are highly laden with metal ions, such as ground water and other process water sources, to be used in formulating a viscosified fluid, such as a fracturing fluid or a gravel packing fluid. In particular, the disclosure herein can obviate the need to source and transport large quantities of water to and from a remote job site, and to store metal-laden water at a job site until it can be removed or remediated. Collectively, the present disclosure can significantly facilitate production by lowering logistical and infrastructure expenses, as well as providing time savings.

In more particular regard to the above, N-(phosphonoalkyl)iminodiacetic acids and their salts (e.g., alkali metal salts) may be used to mitigate the presence of metal ions in a metal-laden water source, such as ground water and other process water sources. An illustrative example of an N-(phosphonoalkyl)iminodiacetic acid that can be used for this purpose is N-(phosphonomethyl)iminodiacetic acid (PMIDA). PMIDA effectively complexes a variety of metal ions with a range of stability constants. Table 1 below shows the stability constants at 20° C. of several alkaline earth metal ions complexed with PMIDA and its salts. Transition metal ions and lanthanide metal ions may be complexed in a similar manner with this chelating agent.

TABLE 1

| Metal Ion | $Log_{10}$ of Stability Constant |
|---|---|
| $Mg^{2+}$ | 6.28 |
| $Ca^{2+}$ | 7.18 |
| $Sr^{2+}$ | 5.59 |
| $Ba^{2+}$ | 5.35 |

The complexes shown in Table 1 are at least partially soluble in modestly acidic aqueous fluids, such as those having a pH of about 2 or above. Because PMIDA has a low first pKa value (~2.0), it can remain at least partially deprotonated and active for metal ion complexation at pH ranges where many other carboxylic acid-based chelating agents are protonated and inactive or only weakly active for this purpose. Since PMIDA and other N-(phosphonoalkyl)iminodiacetic acids can promote metal ion complexation over a broad pH range, these compounds may effectively remediate a metal-laden water source into a condition suitably compatible with a variety of crosslinking agents operable for use over a breadth of pH values. Further, the good complexation properties of PMIDA and other N-(phosphonoalkyl)iminodiacetic acids and their salts may provide superior performance compared to other chelating agents, thereby allowing low quantities of these chelating agents to be used in forming a remediated water.

PMIDA and other N-(phosphonoalkyl)iminodiacetic acids can also present a number of other advantages for use in converting a metal-laden water source into a remediated water. PMIDA is a relatively inexpensive material, thereby not adding an excessive cost burden to large scale operations, such as subterranean treatment operations. Moreover, PMIDA is believed to be environmentally benign, due at least in part to its propensity toward biodegradation. As used herein, the terms "biodegradation," "biodegradable" and related variants thereof will refer to a substance that can be broken down by exposure to environmental conditions including native or non-native microbes, sunlight, air, heat, and the like. No particular rate of biodegradation is implied by use of these terms unless otherwise specified herein. PMIDA advantageously possesses a sufficiently high chemical stability over the short term to provide a non-interfering metal complex in a remediated water, but a short enough biodegradation lifetime to make it environmentally friendly for use in most locales. Still further, PMIDA has a good thermal stability profile, thereby allowing it to be used in high temperature subterranean formations, including those having a temperature above about 300° F., in order to retain problematic metal ions in a complexed form. As a final advantage, PMIDA's physical state is an easily transported and handled solid, which can be simply added to a water source at a job site, usually without implementing significant infrastructure modifications over existing equipment.

Electrocoagulation is another water purification technique with which the methods of the present disclosure are also compatible. Electrocoagulation processes and equipment suitable for removing a variety of contaminants, including metal ions, from a water source will be familiar to one having ordinary skill in the art. The CLEANWAVE system offered by Halliburton Energy Services represents an illustrative example of electrocoagulation equipment that can be used in conjunction with the methods of the present disclosure. In this regard, in some embodiments, electrocoagulation may be carried out on a metal-laden water source before complexing metal ions therein through the methods of the present disclosure. Alternately, remediated water formed by the methods of the present disclosure may be subjected to electrocoagulation before formulating a viscosified fluid therefrom. Advanced oxidation processes may also be used in this regard. In any case, more complete purification of the initial metal-laden water source may be realized by using the combined techniques.

In various embodiments, methods described herein may comprise: providing a metal-laden water comprising a quantity of one or more metal ions; combining an N-(phosphonoalkyl)iminodiacetic acid or a salt thereof with the metal-laden water to form a remediated water, the remediated water comprising the N-(phosphonoalkyl)iminodiacetic acid, the salt thereof, a metal complex thereof or a combination thereof; and formulating the remediated water into a fracturing fluid comprising a gelled polymer.

In some embodiments, the N-(phosphonoalkyl)iminodiacetic acid or its salt may be combined with the metal-laden water as a solid in the course of forming the remediated water. In other embodiments, the N-(phosphonoalkyl)iminodiacetic acid or its salt may be provided as a concentrated aqueous solution that is added to the metal-laden water. Organic co-solvents may also be present in the concentrated aqueous solution, if desired. In still other alternative embodiments, the N-(phosphonoalkyl)iminodiacetic acid or its salt may be provided as a concentrated solution in a water-miscible organic solvent that is subsequently added to the metal-laden water. In some embodiments, a gel concentrate of the N-(phosphonoalkyl)iminodiacetic acid or its salt may be combined with the metal-laden water. The gel concentrate may comprise the N-(phosphonoalkyl)iminodiacetic acid or its salt, a gelling agent and an aqueous carrier fluid.

The N-(phosphonoalkyl)iminodiacetic acid may be combined with the metal-laden water in its neutral form or a salt form. The salt form may improve solubility over the free acid form. When used, suitable salt forms for the N-(phosphonoalkyl)iminodiacetic acid can include alkali metal salts, for example. Alkali metal salts may be less likely to disrupt crosslinking in a viscosified fluid formed from the remediated water. In fact, alkali metal ions may actually promote crosslinking in certain cases, thereby allowing less crosslinking agent to be used. However, alkali metal ions may preclude use of the remediated water in formulating some types of treatment fluids, such as acidizing fluids for siliceous formations, where the alkali metal ions may induce precipitation of insoluble silicon species. In some embodiments, the N-(phosphonoalkyl)iminodiacetic acid may be combined with the metal-laden water in its neutral form so as to preclude introducing significant amounts of other metal ions into the metal-laden water.

In various embodiments, the neutral form of the N-(phosphonoalkyl)iminodiacetic acid used in forming the fracturing fluids and other viscosified fluids of the present disclosure may have the structure shown in Formula 1

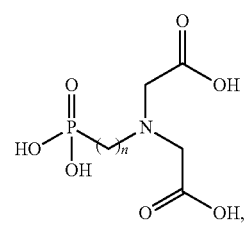

Formula 1 wherein n is an integer ranging between 1 and about 5. In some embodiments, a particularly suitable N-(phosphonoalkyl)iminodiacetic acid for practicing the disclosure herein can be N-(phosphonomethyl)iminodiacetic acid, in which n is 1. Additional functionality may also be introduced to the N-(phosphonoalkyl)iminodiacetic acid in order to further tailor its solubility, pKa values, and/or biodegradation rate, for example.

In various embodiments, a concentration of the N-(phosphonoalkyl)iminodiacetic acid in the fracturing fluid in any form may range between about 0.5 wt. % to about 55 wt. %. Forms of the N-(phosphonoalkyl)iminodiacetic acid that may be present in the fracturing fluid include the fully protonated free acid, a salt of the free acid, a metal complex of the free acid, or any combination thereof. In more particular embodiments, a concentration of the N-(phosphonoalkyl)iminodiacetic acid, the salt thereof, the metal complex thereof, or the combination thereof in the fracturing fluid may be about 10 wt. % or less, such as a concentration of any of these components in any combination ranging between about 0.5 wt. % and about 10 wt. %. In still more particular embodiments, a concentration of the N-(phosphonoalkyl)iminodiacetic acid, the salt thereof, the metal complex thereof, or the combination thereof in the fracturing fluid may be about 5 wt. % or less, such as a concentration of any of these components in any combination ranging between about 0.5 wt. % and about 5 wt. %. An amount of the N-(phosphonoalkyl)iminodiacetic acid or a salt thereof may be chosen to provide a concentration within the foregoing ranges in the formulated fracturing fluid. Choice of a suitable concentration for the N-(phosphonoalkyl)iminodiacetic acid or its salt may be based upon, for example, a concentration of metal ions in the initial metal-laden water.

Although the N-(phosphonoalkyl)iminodiacetic acid and its salts or metal complexes may be co-present in the formulated fracturing fluid, it may be desirable to exercise some measure of control over an amount of the N-(phosphonoalkyl)iminodiacetic acid or a salt thereof that is initially present. Ideally, the N-(phosphonoalkyl)iminodiacetic acid or its salt may be added in a sufficient amount to the metal-laden water to achieve complexation of at least a majority of its metal ions. Complexing a majority of the metal ions may decrease the likelihood of the metal ions interfering with gelation of a fracturing fluid, such as through ineffective crosslinking, delayed crosslinking, or the like. It is to be recognized, however, that all of the metal ions in the metal-laden water need not necessarily undergo complexation by the N-(phosphonoalkyl)iminodiacetic acid in order to successfully formulate a fracturing fluid by the methods of the present disclosure. One having ordinary skill in the art and the benefit of this disclosure may determine an amount of uncomplexed metal ions that may remain present in order to successfully formulate a fracturing fluid.

In some embodiments, there may be substantially no uncomplexed N-(phosphonoalkyl)iminodiacetic acid or a salt thereof present in the fracturing fluid. By having substantially no uncomplexed N-(phosphonoalkyl)iminodiacetic acid or a salt thereof present in the fracturing fluid, the N-(phosphonoalkyl)iminodiacetic acid or its salt may be precluded from inadvertently complexing a desired metal ion crosslinking agent and preventing a crosslinking reaction from occurring. Optionally, a small amount of residual N-(phosphonoalkyl)iminodiacetic acid or a salt thereof may remain in the fracturing fluid, provided that the amount is insufficient to complex the amount of metal ion crosslinking agent that is present. Accordingly, if a sufficient amount of metal ion crosslinking agent may be added to form a viscosified fluid, some degree of residual N-(phosphonoalkyl)iminodiacetic acid or a salt thereof may be tolerated. Alternately, if crosslinking is accomplished with a crosslinking agent that does not include metal ions, residual N-(phosphonoalkyl)iminodiacetic acid or a salt thereof may remain in the fracturing fluid.

In more specific embodiments, an amount of the N-(phosphonoalkyl)iminodiacetic acid or a salt thereof combined with the metal-laden water may be sub-stoichiometric with respect to the quantity of the one or more metal ions present therein. As used herein, the term "sub-stoichiometric" refers to an amount of the chelating agent that is insufficient on a molar equivalence basis to react fully with the total molar amount of metal ions present in the metal-laden water. By using a sub-stoichiometric amount of the N-(phosphonoalkyl)iminodiacetic acid or its salt, complexation of a desired metal ion crosslinking agent in the fracturing fluid may be substantially averted by not having residual uncomplexed N-(phosphonoalkyl)iminodiacetic acid or its salt in the fracturing fluid. In some embodiments, a sub-stoichiometric amount of the N-(phosphonoalkyl)iminodiacetic acid or a salt thereof may comprise about 0.1 to about 0.99 stoichiometric equivalents relative to a molar amount of metal ions present in the metal-laden water. In more specific embodiments, a sub-stoichiometric amount of the N-(phosphonoalkyl)iminodiacetic acid or a salt thereof may comprise about 0.6 to about 0.99 stoichiometric equivalents relative to a molar amount of metal ions present in the metal-laden water, or about 0.7 to about 0.99 stoichiometric equivalents, or about 0.8 to about 0.99 stoichiometric equivalents, or about 0.9 to about 0.99 stoichiometric equivalents, or about 0.95 to about 0.99 stoichiometric equivalents. Determination of an appropriate amount of the N-(phosphonoalkyl)iminodiacetic acid or a salt thereof to add to the metal-laden water may be based upon a previous analysis of the type and quantity of metal ions present in the metal-laden water.

In further embodiments, methods of the present disclosure may further comprise complexing at least a portion of the one or more metal ions in the metal-laden water with the N-(phosphonoalkyl)iminodiacetic acid or the salt thereof. As discussed above, formation of a metal complex, such as a metal chelate, may mitigate the reactivity of the metal ions and prevent undesired viscosity changes from occurring in a fracturing fluid formulated from the metal-laden water. In some embodiments, complexation of metal ions may occur by adding the N-(phosphonoalkyl)iminodiacetic acid or the salt thereof to the metal-laden water in an in-line process. In further embodiments, the remediated water formed therefrom may be formulated without further processing into a fracturing fluid or other viscosified fluid.

In various embodiments, metal ions that may be complexed by the N-(phosphonoalkyl)iminodiacetic acid or the salt thereof may comprise alkaline earth ions, transition metal ions, main group metal ions, lanthanide ions, or any combination thereof. In more particular embodiments, metal ions that may be complexed by the N-(phosphonoalkyl)iminodiacetic acid or the salt thereof may include, for example, aluminum, titanium, zirconium, calcium, magnesium, iron, manganese, copper, zinc and any combination thereof. By complexing these metal ions and others, it may be possible to preclude them from inadvertently promoting gelation of the crosslinkable polymer.

In some embodiments, the metal-laden water being processed by the methods disclosed herein may comprise a produced water. As used herein, the term "produced water" refers to water that is expelled from a wellbore penetrating a subterranean formation. Such produced water may comprise, for example, naturally occurring ground water, or flowback water that was previously introduced to the subterranean formation (e.g., a produced treatment fluid). Other types of process water containing one or more metal ions may be handled similarly.

In general, the methods described herein can be used to formulate any type of viscosified fluid from a metal-laden water source through remediation of the metal ions present therein. Fracturing fluids and gravel packing fluids represent illustrative examples. Other types of viscosified fluids containing a gelled polymer that may be of interest include, for example, drilling fluids, conformance fluids, viscous sweeps, kill pills and the like.

In more particular embodiments, the methods described herein may be used to formulate fracturing fluids or other viscosified fluids comprising a gelled polymer. A gelled polymer may comprise a crosslinkable polymer and an optional crosslinking agent. The crosslinkable polymer need not necessarily be crosslinked when the polymer is gelled.

Crosslinkable polymers that may be present in the fracturing fluids of the present disclosure are not believed to be particularly limited. Suitable crosslinkable polymers may include acrylamide polymers and copolymers, biopolymers and copolymers, and derivatives thereof. Salts of these polymers may be used as well. Suitable biopolymers may comprise polysaccharides, and derivatives thereof, including those having one or more of the following monosaccharide units: galactose, mannose, glucoside, glucose, xylose, arabinose, fructose, glucuronic acid, or pyranosyl sulfate. Examples of suitable biopolymers may include, but are not limited to, guar and guar derivatives (e.g., hydroxypropyl guar, carboxymethyl guar, hydroxyethyl guar, and carboxymethylhydroxypropyl guar), cellulose and cellulose derivatives (e.g., carboxymethyl cellulose, carboxyethyl cellulose, hydroxypropyl cellulose, hydroxyethyl cellulose, and carboxymethylhydroxyethyl cellulose), xanthan and derivatives thereof, diutans and derivatives thereof, scleroglucans and derivatives thereof, chitosan and derivatives thereof, and nanocellulose. Other suitable crosslinkable polymers include, for example, synthetic acrylamide polymers and copolymers, including those bearing phosphonate, sulfonate and/or amino functional groups. Combinations of the foregoing crosslinkable polymers may also be used.

Depending on the crosslinkable polymer chosen for forming a particular fracturing fluid and the fluid's desired characteristics, a variety of crosslinking agents, if used, may similarly be chosen for forming a gelled polymer. The chosen crosslinking agent may determine various characteristics of the fracturing fluid such as the gelling time, the optimal pH of the fracturing fluid, and the like. Considerations for choosing a suitable crosslinking agent for a particular set of conditions lies within the ability of one having ordinary skill in the art.

In more particular embodiments, the gelled polymer of the instantly described fracturing fluids may comprise a metal-crosslinked polymer. The metal-crosslinked polymer may be formed using a crosslinking metal ion that is combined with the remediated water and a crosslinkable polymer. Particular crosslinking metal ions of interest may include, for example, aluminum ions, iron ions, titanium ions, zirconium ions, or other transition metal ions. As discussed above, the methods of the present disclosure may substantially preclude metal ions present in the metal-laden water from deleteriously competing with the crosslinking metal ions in promoting a crosslinking reaction. In illustrative embodiments, a suitable pH range for the remediated water may range between about 4.5 and about 8 when polymer crosslinking takes place with metal ions. In further embodiments, the metal-crosslinked polymer may comprise a metal-crosslinked guar, such as metal-crosslinked carboxymethylhydroxypropyl guar.

In other illustrative embodiments, the gelled polymer of the instantly described fracturing fluids may comprise a borate-crosslinked polymer. The borate-crosslinked polymer may be formed from a borate crosslinking agent that is combined with the remediated water and the crosslinkable polymer. Suitable borate crosslinking agents may comprise boric acid, boronates, and boronic acids. As discussed above, by practicing the embodiments of the present disclosure, inadvertent crosslinking promoted by metal ions in the metal-laden water may be precluded, thereby allowing a borate crosslinking agent to function in its intended manner. In illustrative embodiments, a suitable pH range for the remediated water may lie between about 8.5 and about 12 when polymer crosslinking takes place using a borate crosslinking agent.

In further embodiments, methods described herein may further comprise introducing the fracturing fluid into a subterranean formation at a pressure sufficient to create or extend at least one fracture in the subterranean formation. That is, the fracturing fluids may be used in a fracturing operation in which the fracturing fluid is introduced to a wellbore at or above the fracture gradient pressure of the subterranean formation. One having ordinary skill in the art will recognize suitable techniques to determine the fracture gradient pressure for a particular subterranean formation.

The metal-laden water or the remediated water may optionally be purified in an electrocoagulation process before formulating the remediated water into a fracturing fluid. In some embodiments, the metal-laden water may first be purified by an electrocoagulation process, and the resultant partially purified water may then be further purified by combining it with an N-(phosphonoalkyl)iminodiacetic acid or a salt thereof to form the remediated water. When an electrocoagulation process is performed first, the quantity of metal ions needing complexation with the N-(phosphonoalkyl)iminodiacetic acid or a salt thereof may desirably be lessened. In other embodiments, an N-(phosphonoalkyl)iminodiacetic acid or a salt thereof may first be combined with the metal-laden water, and the combined mixture may then be subjected to an electrocoagulation process to form the remediated water for formulation into a fracturing fluid.

Accordingly, in some embodiments, methods of the present disclosure may comprise: combining an N-(phosphonoalkyl)iminodiacetic acid or a salt thereof with a metal-laden water to form a remediated water, the metal-laden water comprising a produced water comprising a quantity of one or more metal ions; complexing at least a portion of the one or more metal ions with the N-(phosphonoalkyl)iminodiacetic acid or the salt thereof to form a metal complex thereof; and formulating the remediated water and the metal complex into a fracturing fluid comprising a gelled polymer, the gelled polymer being crosslinked with a crosslinking metal ion.

In other various embodiments, compositions formulated from produced water or other process water sources are disclosed herein. In more particular embodiments, fracturing fluids formulated from produced water are disclosed herein. The fracturing fluids may comprise: a remediated water formed from a produced water comprising a quantity of one or more metal ions, and an N-(phosphonoalkyl)iminodiacetic acid or a salt thereof; and a gelled polymer. At least a portion of the one or more metal ions are complexed by the N-(phosphonoalkyl)iminodiacetic acid or the salt thereof in the remediated water. Accordingly, the fracturing fluids of the present disclosure may comprise at least water, a metal complex of an N-(phosphonoalkyl)iminodiacetic acid or a salt thereof, and a gelled polymer.

In further embodiments, an organic co-solvent may be combined with the remediated water in the fracturing fluid. Suitable organic co-solvents may include, but are not limited to, glycols and alcohol solvents, for example. When present, an amount of the organic co-solvent may range between about 1% to about 50% by volume of the fracturing fluid.

In various embodiments, proppant particulates may also be present in the fracturing fluids disclosed herein. Proppant particulates suitable for use in the various embodiments of the present disclosure are not believed to be particularly limited. Illustrative proppant particulates that may be used in conjunction with the embodiments described herein include, for example, sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and any combination thereof. Suitable composite particulates may comprise a binder and a filler material in which suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, the like, and any combination thereof. The mean particulate size of the proppant particulates generally may range from about 2 mesh to about 400 mesh on the U.S. Sieve Series, although other sizes or mixtures of sizes may be desirable in certain embodiments. The proppant particulates may be substantially spherical materials, fibrous materials, polygonal materials (such as cubic materials), irregular shapes, and any combination thereof. Gravel particulates are similarly not believed to be particularly limited for use in gravel packing fluids containing a gelled polymer.

In other additional embodiments, the fracturing fluids and other viscosified fluids described herein may further comprise any number of additives that are commonly used in downhole operations including, for example, silica scale control additives, corrosion inhibitors, surfactants, gel stabilizers, anti-oxidants, polymer degradation prevention additives, relative permeability modifiers, scale inhibitors, foaming agents, defoaming agents, antifoaming agents, emulsifying agents, de-emulsifying agents, iron control agents, other particulates, particulate diverters, acids, fluid loss control additives, gas, catalysts, clay control agents, dispersants, flocculants, scavengers (e.g., $H_2S$ scavengers, $CO_2$ scavengers or $O_2$ scavengers), gelling agents, lubricants, friction reducers, bridging agents, viscosifiers, weighting agents, solubilizers, pH control agents (e.g., buffers), hydrate inhibitors, consolidating agents, bactericides, catalysts, clay stabilizers, breakers, delayed release breakers, acids, bases, and the like. Any combination of these additives may be used as well. One of ordinary skill in the art will be able to formulate a fluid having properties suitable for a given application.

In still other various embodiments, systems configured for delivering a fracturing fluid of the present disclosure to a downhole location are described herein. In various embodiments, the systems can comprise a pump fluidly coupled to a tubular, the tubular containing a fracturing fluid comprising: a remediated water formed from a produced water comprising a quantity of one or more metal ions, and an N-(phosphonoalkyl)iminodiacetic acid or a salt thereof; and a gelled polymer. At least a portion of the one or more metal ions are complexed by the N-(phosphonoalkyl)iminodiacetic acid or the salt thereof in the remediated water.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce a fracturing fluid of the present disclosure to a subterranean formation at or above a fracture gradient of the subterranean formation, but it may also be used in cases where fracturing is not desired. The fracturing fluids described herein may be introduced with a high pressure pump, or they may be introduced following a treatment fluid (e.g., a pad fluid) that was introduced with a high pressure pump. In some embodiments, the high pressure pump may be capable of fluidly conveying particulate matter into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the fracturing fluid to the high pressure pump. In such embodiments, the low pressure pump may "step up" the pressure of a fracturing fluid before it reaches the high pressure pump.

In some embodiments, the systems described herein can further comprise a mixing tank that is upstream of the pump and in which the N-(phosphonoalkyl)iminodiacetic acid or a salt thereof is formulated with the metal-laden produced water. A gellable polymer may also be combined in the mixing tank before conveyance to the subterranean formation. Proppant particulates may be added in the mixing tank or introduced in the fluid stream travelling from the mixing tank to the tubular. In various embodiments, the pump (e.g., a low pressure pump, a high pressure pump, or a combination thereof) may convey the fracturing fluid from the mixing tank or other source of the fracturing fluid to the tubular. In other embodiments, however, the fracturing fluid can be formulated offsite and transported to a worksite, in which case the fracturing fluid may be introduced to the tubular via the pump directly from its shipping container (e.g., a truck, a railcar, a barge, or the like) or from a transport pipeline. In either case, the fracturing fluid may be drawn by the pump, elevated to an appropriate pressure, and then introduced into the tubular for delivery downhole.

FIG. 1 shows an illustrative schematic of a system that can deliver fracturing fluids of the present disclosure to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which a fracturing fluid of the present disclosure may be formulated. The fracturing fluid may be conveyed via line 12 to well 14, where the fracturing fluid enters tubular 16, which extends into subterranean formation 18. Tubular 16 may include orifices that allow the fracturing fluid to enter into the wellbore and fracture subterranean formation 18. Pump 20 may be configured to raise the pressure of the fracturing fluid to a desired degree before its introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like. In addition, a supply line for produced water to mixing tank 10 may also be present.

It is also to be recognized that the disclosed fracturing fluids may also directly or indirectly affect the various downhole equipment and tools that may come into contact with the fracturing fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

Embodiments disclosed herein include:

A. Methods for formulating a fracturing fluid from remediated water. The methods comprise: providing a metal-laden water comprising a quantity of one or more metal ions; combining an N-(phosphonoalkyl)iminodiacetic acid or a salt thereof with the metal-laden water to form a remediated water, the remediated water comprising the N-(phosphonoalkyl)iminodiacetic acid, the salt thereof, a metal complex thereof or a combination thereof; and formulating the remediated water into a fracturing fluid comprising a gelled polymer.

B. Methods for formulating a fracturing fluid from remediated water. The methods comprise: combining an N-(phosphonoalkyl)iminodiacetic acid or a salt thereof with a metal-laden water to form a remediated water, the metal-laden water comprising a produced water comprising a quantity of one or more metal ions; complexing at least a portion of the one or more metal ions with the N-(phosphonoalkyl)iminodiacetic acid or the salt thereof to form a metal complex thereof; and formulating the remediated water and the metal complex into a fracturing fluid comprising a gelled polymer, the gelled polymer being crosslinked with a crosslinking metal ion.

C. Fracturing fluid compositions formed from remediated water. The fracturing fluids comprise: a remediated water formed from a produced water comprising a quantity of one or more metal ions, and an N-(phosphonoalkyl)iminodiacetic acid or a salt thereof, at least a portion of the one or more metal ions being complexed by the N-(phosphonoalkyl)iminodiacetic acid or the salt thereof in the remediated water; and a gelled polymer.

D. Systems for introducing remediated water into a subterranean formation. The systems comprise: a pump fluidly coupled to a tubular, the tubular containing a fracturing fluid comprising: a remediated water formed from a produced water comprising a quantity of one or more metal ions, and an N-(phosphonoalkyl)iminodiacetic acid or a salt thereof, at least a portion of the one or more metal ions being complexed by the N-(phosphonoalkyl)iminodiacetic acid or the salt thereof in the remediated water; and a gelled polymer.

Each of embodiments A-D may have one or more of the following additional elements in any combination:

Element 1: wherein the method further comprises: introducing the fracturing fluid into a subterranean formation at a pressure sufficient to create or extend at least one fracture in the subterranean formation.

Element 2: wherein the metal-laden water comprises a produced water.

Element 3: wherein the method further comprises: complexing at least a portion of the one or more metal ions in the metal-laden water with the N-(phosphonoalkyl)iminodiacetic acid or the salt thereof.

Element 4: wherein a concentration of the N-(phosphonoalkyl)iminodiacetic acid, the salt thereof, the metal complex thereof, or the combination thereof in the fracturing fluid is about 10 wt. % or less.

Element 5: wherein substantially no uncomplexed N-(phosphonoalkyl)iminodiacetic acid or a salt thereof is present in the fracturing fluid.

Element 6: wherein the N-(phosphonoalkyl)iminodiacetic acid has a structure of

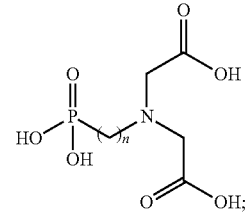

wherein n is an integer ranging between 1 and about 5.

Element 7: wherein the N-(phosphonoalkyl)iminodiacetic acid comprises N-(phosphonomethyl)iminodiacetic acid.

Element 8: wherein the gelled polymer comprises a metal-crosslinked polymer.

Element 9: wherein the remediated water has a pH ranging between about 4.5 and about 8.

Element 10: wherein the method further comprises: purifying the metal-laden water or the remediated water in an electrocoagulation process before formulating the remediated water into the fracturing fluid.

Element 11: wherein an amount of the N-(phosphonoalkyl)iminodiacetic acid or the salt thereof combined with the metal-laden water is sub-stoichiometric with respect to the quantity of the one or more metal ions.

Element 12: wherein a concentration of the N-(phosphonoalkyl)iminodiacetic acid, the salt thereof, the metal complex thereof, or a combination thereof in the fracturing fluid is about 10 wt. % or less.

Element 13: wherein substantially no uncomplexed N-(phosphonoalkyl)iminodiacetic acid or a salt thereof is present in the fracturing fluid.

Element 14: wherein the metal-crosslinked polymer comprises a metal-crosslinked guar.

Element 15: wherein the fracturing fluid further comprises a plurality of proppant particulates.

By way of non-limiting example, exemplary combinations applicable to A-D include:

The method of A in combination with elements 2 and 3.
The method of A in combination with elements 3 and 5.
The method of A in combination with elements 4 and 5.
The method of A in combination with elements 6 and 9.
The method of A in combination with elements 1 and 8.
The method of A in combination with elements 5 and 11.
The method of B in combination with elements 1 and 4.
The method of B in combination with elements 5 and 11.

The method of B in combination with elements 8, 14 and 15.

The method of B in combination with elements 12 and 13.

The method of B in combination with elements 8 and 9.

The fracturing fluid of C or the system of D in combination with elements 4 and 5.

The fracturing fluid of C or the system of D in combination with elements 8 and 9.

The fracturing fluid of C or the system of D in combination with elements 11 and 12.

The fracturing fluid of C or the system of D in combination with elements 14 and 15.

To facilitate a better understanding of the embodiments of the present disclosure, the following examples of preferred or representative embodiments are given. In no way should the following examples be read to limit, or to define, the scope of the disclosure.

Examples

A non-treated produced water sample having the following analysis in Table 2 was obtained:

TABLE 2

| Specific Gravity | 1.185 |
| pH | 4.47 |
| [OH$^-$] (ppm) | 0 |
| [CO$_3^{2-}$] (ppm) | 0 |
| [HCO$_3^-$] (ppm) | 324.6 |
| [Cl$^-$] (ppm) | 132007 |
| [SO$_4^{2-}$] (ppm) | 225.8 |
| [Al] (ppm) | 2.65 |
| [B] (ppm) | 447 |
| [Ba] (ppm) | 27.76 |
| [Ca] (ppm) | 22230 |
| [Fe] (ppm) | 179.3 |
| [K] (ppm) | 8210 |
| [Mg] (ppm) | 1230 |
| [Na] (ppm) | 87634 |
| [Sr] (ppm) | 1729 |
| Total Dissolved Solids (ppm) | 243651 |
| Ionic Strength (M) | 5.33 |
| Total Suspended Solids (ppm) | 664 |

Control and test fluids were then formulated from the produced water, as described below.

Figure 2:
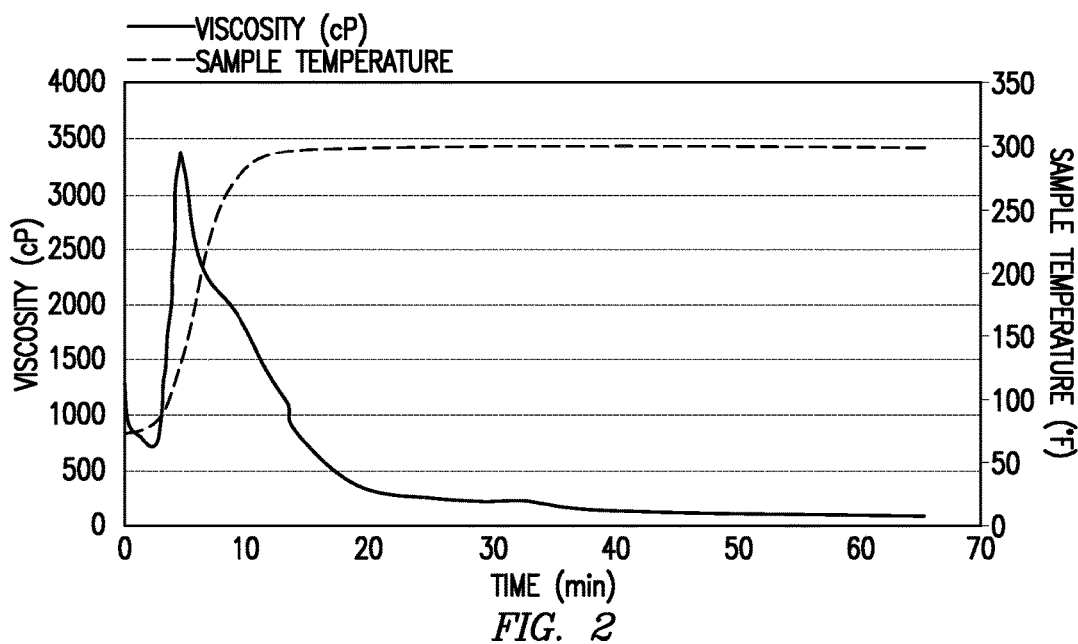
FIG. 2 shows a plot of viscosity as a function of time for a viscosified fluid formed from an untreated metal-laden produced water.

Control Fluid:

A quantity of the produced water was obtained and sodium hydroxide (MO-67, Halliburton Energy Services) was added to a concentration of 0.02% v/v, which raised the initial pH to approximately 5.5. A crosslinkable guar derivative (WG-18, Halliburton Energy Services) was added to a concentration of 5.5% w/v along with a surfactant at 0.1% v/v. The gelling agent was then allowed to hydrate for 45 minutes. The measured viscosity at this point was 77.5 cP and the pH was 5.52. Thereafter, a zirconate crosslinking agent (CL-37, Halliburton Energy Services) was added at a concentration of 0.5% v/v and mixing was allowed to occur for one minute. Following mixing, 73 mL of the crosslinked fluid was added to a Chandler 5550 rheometer. The viscosity was measured at a rotor speed of 40 s$^{-1}$ as the temperature was ramped to 300° F. over 5 minutes time and held at that temperature for the remainder of the test. The ultimate viscosity was 100 cP. FIG. 2 shows a plot of viscosity as a function of time for a viscosified fluid formed from an untreated metal-laden produced water.

Test Fluid.

Figure 3:
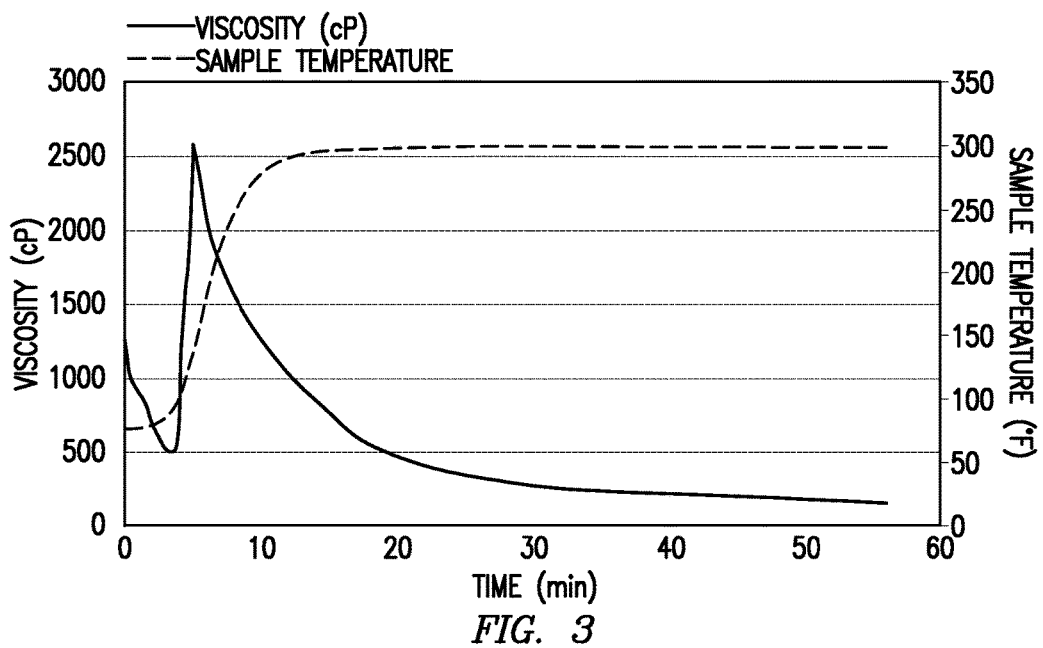
FIG. 3 shows a plot of viscosity as a function of time for a viscosified fluid formed from a metal-laden produced water remediated with N-(phosphonomethyl)iminodiacetic acid (PMIDA).

The test fluid was formulated similarly to the control fluid, except 2 wt. % PMIDA was added to the produced water initially, thereby lowering the initial pH to 1.5. MO-67 was added at a loading of 0.52% v/v to raise the pH to approximately 5.5. After adding the gelling agent and surfactant as in the control fluid, the viscosity was 77.5 cP and the pH was 5.72, values very similar to those of the control fluid. After adding the crosslinking agent and mixing as above, the ultimate viscosity was 200 cP. FIG. 3 shows a plot of viscosity as a function of time for a viscosified fluid formed from a metal-laden produced water remediated with PMIDA. As can be seen, the presence of PMIDA in the viscosified fluid markedly increased the fluid's viscosity under otherwise similar conditions.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the specification and attached claims are approximations that may vary depending upon the desired properties sought to be obtained by the embodiments of the present disclosure. At the very least, and not as an attempt to limit the application of the doctrine of equivalents to the scope of the claim, each numerical parameter should at least be construed in light of the number of reported significant digits and by applying ordinary rounding techniques.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The disclosure illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
providing a metal-laden water comprising a quantity of one or more metal ions;
combining an N-(phosphonoalkyl)iminodiacetic acid or a salt thereof with the metal-laden water to form a remediated water, the remediated water comprising the N-(phosphonoalkyl)iminodiacetic acid, the salt thereof, a metal complex thereof or a combination thereof; wherein an amount of the N-(phosphonoalkyl)iminodiacetic acid or a salt thereof combined with the metal-laden water is sub-stoichiometric with respect to the quantity of the one or more metal ions;

formulating the remediated water into a fluid comprising a gelled polymer, and introducing the fluid into a subterranean formation.

2. The method of claim 1, further comprising:
wherein introducing the fluid into the subterranean formation comprises introducing the fluid at a pressure sufficient to create or extend at least one fracture in the subterranean formation.

3. The method of claim 1, wherein the metal-laden water comprises a produced water.

4. The method of claim 1, further comprising:
complexing at least a portion of the one or more metal ions in the metal-laden water with the N-(phosphonoalkyl)iminodiacetic acid or the salt thereof.

5. The method of claim 1, wherein a concentration of the N-(phosphonoalkyl)iminodiacetic acid, the salt thereof, the metal complex thereof, or the combination thereof in the fluid is about 10 wt. % or less.

6. The method of claim 5, wherein substantially no uncomplexed N-(phosphonoalkyl)iminodiacetic acid or a salt thereof is present in the fluid.

7. The method of claim 1, wherein the N-(phosphonoalkyl)iminodiacetic acid has a structure of

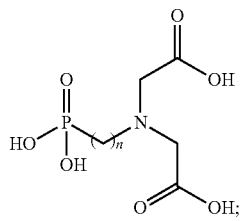

wherein n is an integer ranging between 1 and about 5.

8. The method of claim 7, wherein the N-(phosphonoalkyl)iminodiacetic acid comprises N-(phosphonomethyl)iminodiacetic acid.

9. The method of claim 1, wherein the gelled polymer comprises a metal-crosslinked polymer.

10. The method of claim 9, wherein the remediated water has a pH ranging between about 4.5 and about 8.

11. The method of claim 1, further comprising:
purifying the metal-laden water or the remediated water in an electrocoagulation process before formulating the remediated water into the fluid.

12. A method comprising:
combining an N-(phosphonoalkyl)iminodiacetic acid or a salt thereof with a metal-laden water to form a remediated water, the metal-laden water comprising a produced water comprising a quantity of one or more metal ions; wherein an amount of the N-(phosphonoalkyl)iminodiacetic acid or a salt thereof combined with the metal-laden water is sub-stoichiometric with respect to the quantity of the one or more metal ions;

complexing at least a portion of the one or more metal ions with the N-(phosphonoalkyl)iminodiacetic acid or the salt thereof to form a metal complex thereof;

formulating the remediated water and the metal complex into a comprising a gelled polymer, the gelled polymer being crosslinked with a crosslinking metal ion; and introducing the fluid into a subterranean formation.

13. The method of claim 12, further comprising:
wherein introducing the into the subterranean formation comprises introducing the fluid at a pressure sufficient to create or extend at least one fracture in the subterranean formation.

14. The method of claim 12, wherein a concentration of the N-(phosphonoalkyl)iminodiacetic acid, the salt thereof, the metal complex thereof, or a combination thereof in the fluid is about 10 wt. % or less.

15. The method of claim 14, wherein substantially no uncomplexed N-(phosphonoalkyl)iminodiacetic acid or a salt thereof is present in the fluid.

16. The method of claim 12, wherein the N-(phosphonoalkyl)iminodiacetic acid has a structure of

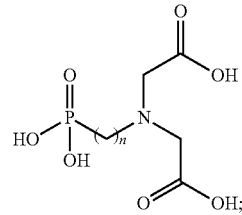

wherein n is an integer ranging between 1 and about 5.

17. The method of claim 16, wherein the N-(phosphonoalkyl)iminodiacetic acid comprises N-(phosphonomethyl)iminodiacetic acid.

18. The method of claim 12, wherein the remediated water has a pH ranging between about 4.5 and about 8.

* * * * *